US011434883B2

(12) United States Patent
Latham et al.

(10) Patent No.: US 11,434,883 B2
(45) Date of Patent: Sep. 6, 2022

(54) VARIABLE CAPACITY DRIVE CIRCUIT FOR A LINEAR COMPRESSOR IN A REFRIGERATION APPLIANCE

(71) Applicant: Haier US Appliance Solutions, Inc., Wilmington, DE (US)

(72) Inventors: Joseph Wilson Latham, Louisville, KY (US); Gregory William Hahn, Mt. Washington, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 29 days.

(21) Appl. No.: 16/952,612

(22) Filed: Nov. 19, 2020

(65) Prior Publication Data
US 2022/0154706 A1 May 19, 2022

(51) Int. Cl.
| *F04B 17/03* | (2006.01) |
| *F25B 49/02* | (2006.01) |
| *F04B 49/06* | (2006.01) |
| *H02P 23/10* | (2006.01) |

(52) U.S. Cl.
CPC .............. *F04B 17/03* (2013.01); *F04B 49/06* (2013.01); *F25B 49/022* (2013.01); *H02P 23/10* (2013.01)

(58) Field of Classification Search
CPC ........ F04B 17/03; F04B 49/022; F04B 49/06; H02P 23/10
See application file for complete search history.

(56) References Cited

U.S. PATENT DOCUMENTS

| 5,715,693 A | * | 2/1998 | van der Walt ............ F25B 5/04 62/227 |
| 5,947,693 A | | 9/1999 | Yang |
| 6,565,327 B2 | | 5/2003 | Yoo et al. |
| 6,857,858 B2 | | 2/2005 | Jeun |
| 6,998,736 B2 | | 2/2006 | Lee et al. |
| 7,402,977 B2 | | 7/2008 | Kim et al. |
| 7,528,560 B2 | | 5/2009 | Bae et al. |
| 2013/0195678 A1 | * | 8/2013 | Yoo .......................... F25B 1/02 417/45 |

(Continued)

FOREIGN PATENT DOCUMENTS

| JP | 2000/110732 A | 4/2000 |
| JP | 2003/309994 A | 10/2003 |

(Continued)

*Primary Examiner* — Patrick Hamo
(74) *Attorney, Agent, or Firm* — Dority & Manning, P.A.

(57) ABSTRACT

A method for operating a variable capacity drive circuit of a compressor includes operating first and second four-quadrant switches in a first state in which the first four-quadrant switch is closed and the second four-quadrant switch is open such that a voltage seen by the motor is equal to an AC line voltage. The method also includes operating the first and second four-quadrant switches in a second state where the first four-quadrant switch is open and the second four-quadrant switch is closed such that the voltage seen by the motor is to zero. Further, the method includes providing a positive firing angle and a negative firing angle for defining when the first and second four-quadrant switches are operated in each of the first and second states. Moreover, the method also includes transitioning between the first and second states using the firing angles at a switching frequency determined by the AC line voltage frequency.

12 Claims, 12 Drawing Sheets

(56) References Cited

U.S. PATENT DOCUMENTS

| | | | | |
|---|---|---|---|---|
| 2016/0215767 | A1* | 7/2016 | Kusumba | F04B 49/065 |
| 2017/0096991 | A1* | 4/2017 | Barito | F04B 53/16 |
| 2017/0122305 | A1* | 5/2017 | Kusumba | F04B 53/16 |
| 2019/0319558 | A1* | 10/2019 | Kusumba | H02P 6/17 |

FOREIGN PATENT DOCUMENTS

| | | | |
|---|---|---|---|
| JP | 3683316 | B2 | 8/2005 |
| KR | 102070277 | B1 | 1/2020 |

* cited by examiner

US 11,434,883 B2

VARIABLE CAPACITY DRIVE CIRCUIT FOR A LINEAR COMPRESSOR IN A REFRIGERATION APPLIANCE

FIELD OF THE INVENTION

The present subject matter relates generally to linear compressors, and more particularly, to a variable capacity drive circuit for providing power to a linear compressor in a refrigeration appliance.

BACKGROUND OF THE INVENTION

Generally, refrigerator appliances include a cabinet that defines one or more chilled chambers, such as a fresh food chamber for receipt of food items for storage and/or a freezer chamber for receipt of food items for freezing and storage. Certain refrigerator appliances may also include sealed systems for cooling such chilled chambers thereof. The sealed systems generally include a compressor that generates compressed refrigerant during operation thereof. The compressed refrigerant flows to an evaporator where heat exchanges between the chilled chambers and the refrigerant cools the chilled chambers and food items located therein.

Recently, certain refrigerator appliances have included linear compressors for compressing the refrigerant. Linear compressors generally include a piston within a housing and a driving coil that generates a force for moving the piston forward and backward within the housing. During motion of the piston within the housing, the piston compresses the refrigerant. Furthermore, linear compressors are generally operated by a single-phase variable-frequency drive. The variable-frequency drive is a type of motor drive that is used to control the motor speed and force by varying motor voltage input frequency and amplitude. A single-phase variable-frequency drive typically uses an inverter with a front-end rectifier. However, the H-bridge inverter and front-end rectifier are complex, costly systems that can have high switching losses.

Accordingly, a linear compressor that addresses the aforementioned issues would be useful. Thus, the present disclosure is directed to a linear compressor having an alternative converter design that modulates the amplitude of the excitation voltage applied to the motor.

BRIEF DESCRIPTION OF THE INVENTION

Aspects and advantages of the invention will be set forth in part in the following description, or may be apparent from the description, or may be learned through practice of the invention.

In one aspect, a method for operating a variable capacity drive circuit of a compressor is provided. The variable capacity drive includes a first four-quadrant switch, a second four-quadrant switch, and a motor. The method includes operating the first and second four-quadrant switches in a first state in which the first four-quadrant switch is closed and the second four-quadrant switch is open. As such, in the first state, a voltage seen by the motor is equal to an alternating current (AC) line voltage. The method also includes operating the first and second four-quadrant switches in a second state in which the first four-quadrant switch is open and the second four-quadrant switch is closed. Thus, in the second state, the voltage seen by the motor is equal to zero. The method further includes providing a positive firing angle, and a negative firing angle. The positive and negative firing angles define when the first and second four-quadrant switches are operated in each of the first and second states. The method includes transitioning between the first state and the second state using the positive and negative firing angles at a switching frequency determined by the AC line voltage frequency so as to control a percentage of voltage being applied to the compressor for a positive half-cycle and a negative half-cycle.

In another aspect, a linear compressor is provided. The linear compressor includes a housing defining a piston-cylinder, a motor for driving the piston-cylinder, and a variable capacity drive circuit for driving the motor. The variable capacity drive circuit includes a plurality of four-quadrant switches arranged in a totem pole configuration between an AC line voltage of the linear compressor and the motor. The four-quadrant switches includes, at least, a first four-quadrant switch and a second four-quadrant switch. The variable capacity drive circuit includes operating the first and second four-quadrant switches in a first state and a second state. Further, the variable capacity drive circuit includes a first state in which the first four-quadrant switch is closed, and the second four-quadrant switch is open such that a voltage seen by the motor is equal to an AC line voltage. The variable capacity drive circuit also includes a second state where the first four-quadrant switch is open and the second four-quadrant switch is closed such that the voltage seen by the motor is zero. The variable capacity drive circuit further includes a controller communicatively coupled to each of the four-quadrant switches. The controller is configured to perform a plurality of operations. For example, the plurality of operations may include, but are not limited to providing a positive firing angle and a negative firing angle defining when the first and second four-quadrant switches are opened in each of the first and second states and transitioning between the first state and the second state using the positive and negative firing angles at a switching frequency determined by the AC line voltage frequency so as to control a percentage of voltage being applied to the compressor for a positive half-cycle and a negative half-cycle.

In another aspect, a refrigeration appliance is provided. The refrigeration appliance includes a cabinet having at least one chamber for receipt of a food item. Further, the refrigeration appliance includes a door permitting access to the chamber(s) and a linear compressor for assisting with cooling of the chamber(s). The linear compressor includes a housing defining a piston-cylinder, a motor for driving the piston-cylinder, and a variable capacity drive circuit for driving the motor. The variable capacity drive circuit includes a plurality of four-quadrant switches arranged in a totem pole configuration between an AC line voltage of the linear compressor and the motor. The four-quadrant switches includes, at least, a first four-quadrant switch and a second four-quadrant switch. The variable capacity drive circuit includes operating the first and second four-quadrant switches in a first state and a second state. The variable capacity drive circuit also includes operating the first four-quadrant switch and the second four-quadrant switch in a first state in which the first four-quadrant switch is closed, and the second four-quadrant switch is open such that a voltage seen by the motor is equal to an AC line voltage. The variable capacity drive circuit includes operating the first four-quadrant switch and the second four-quadrant switch in a second state in which the first four-quadrant switch is open and the second four-quadrant switch is closed such that the voltage seen by the motor is zero. The variable capacity drive circuit further includes a controller communicatively coupled to the plurality of four-quadrant switches. The controller is configured to perform a plurality of operations, including but not limited to providing a positive firing angle and a negative firing angle defining when the first and second four-quadrant switches are operated in each of the first and second states and transitioning between the first state and the second state using the positive and negative firing angles at a switching frequency determined by the AC line frequency so as to control a percentage of voltage being applied to the compressor for a positive half-cycle and a negative half-cycle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 11(*b*) is a schematic diagram of another embodiment of a four-quadrant switch configuration according to an embodiment of the present subject matter.

FIG. 11(*c*) is a schematic diagram of still another embodiment of a four-quadrant switch configuration according to an embodiment of the present subject matter.

FIG. 12(*b*) illustrates a graph of another application of firing angles to transition a variable capacity drive circuit between a first state and a second state according to an embodiment of the present subject matter.

FIG. 12(*c*) illustrates a graph of yet another application of angles to transition variable capacity drive circuit between a first state and a second state according to an embodiment of the present subject matter.

FIG. 12(*d*) illustrates a graph of still a further application of firing angles to transition a variable capacity drive circuit between a first state and a second state according to an embodiment of the present subject matter.

Figure 1:
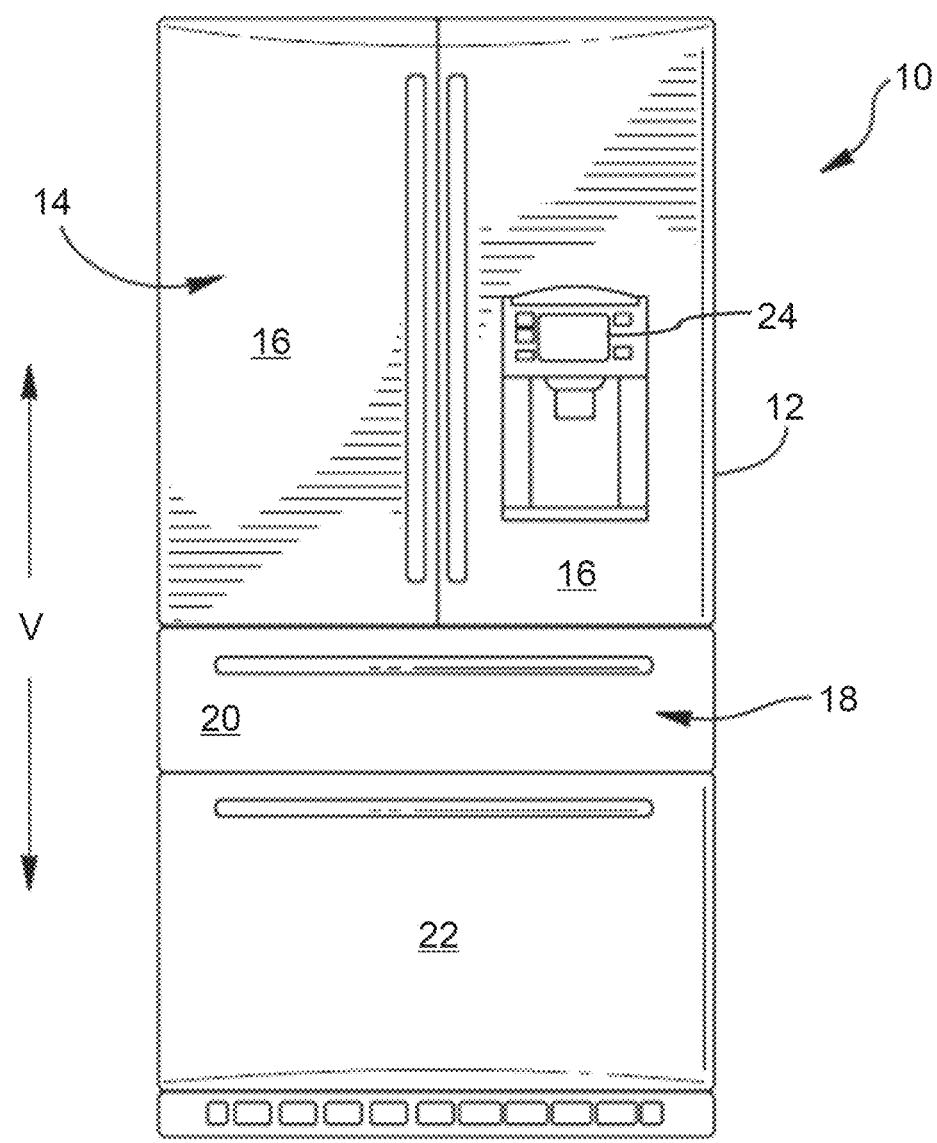
FIG. 1 is a front elevation view of a refrigerator appliance according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
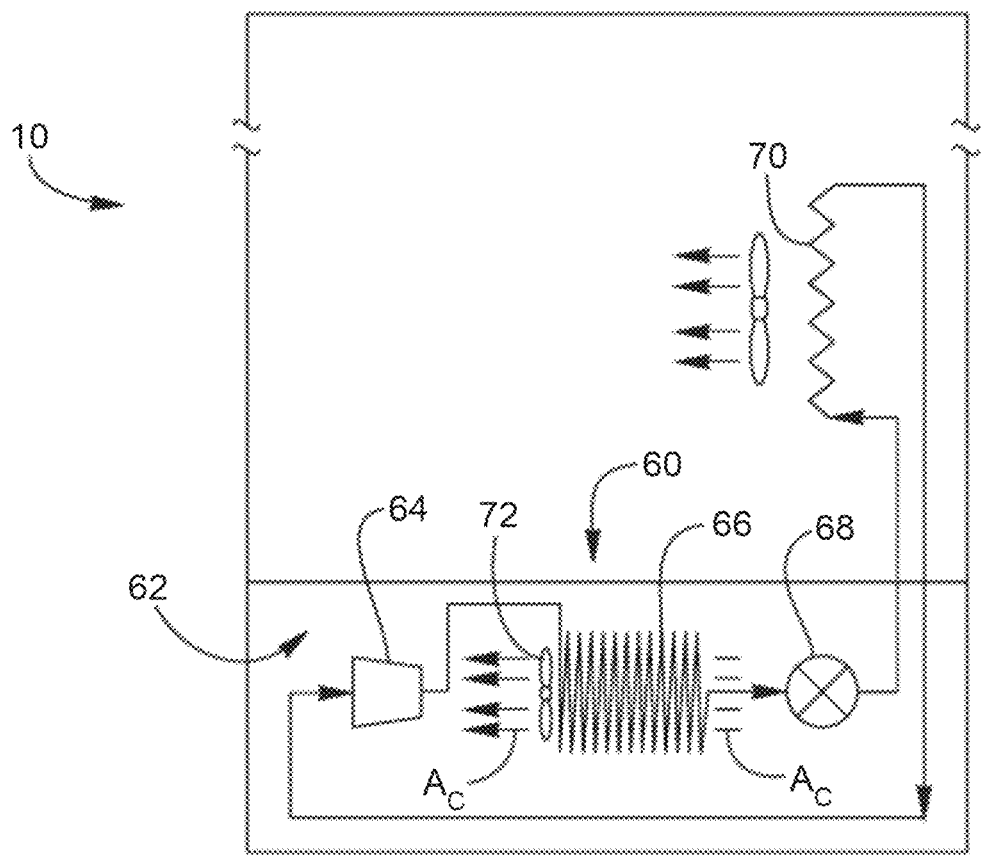
FIG. 2 is schematic view of certain components of the example refrigerator appliance of FIG. 1.

Referring now to the drawings, FIG. 1 depicts a refrigerator appliance 10 that incorporates a sealed refrigeration system 60 (FIG. 2). It should be appreciated that the term "refrigerator appliance" is used generically herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

In the illustrated example embodiment shown in FIG. 1, the refrigerator appliance 10 is depicted as an upright refrigerator having at least one cabinet or casing 12 that defines a number of internal chilled storage compartments. In particular, the refrigerator appliance 10 includes upper fresh-food compartments 14 having doors 16 and lower freezer compartment 18 having upper drawer 20 and lower drawer 22. Further, as shown, the drawers 20 and 22 are "pull-out" drawers in that they can be manually moved into and out of the freezer compartment 18 on suitable slide mechanisms.

Referring now to FIG. 2, a schematic view of certain components of the refrigerator appliance 10, including a sealed refrigeration system 60 of refrigerator appliance 10 is illustrated. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, the refrigeration system 60 may include additional components, e.g., at least one additional evaporator, compressor, expansion device, and/or condenser. As an example, the refrigeration system 60 may include two evaporators.

Within the refrigeration system 60, refrigerant flows into the compressor 64, which operates to increase the pressure of the refrigerant. This compression of the refrigerant raises its temperature, which is lowered by passing the refrigerant through condenser 66. Within the condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device 68 (e.g., a valve, capillary tube, or other restriction device) receives refrigerant from condenser 66. From the expansion device 68, the refrigerant enters the evaporator 70. Upon exiting the expansion device 68 and entering the evaporator 70, the refrigerant drops in pressure. Due to the pressure drop and/or phase change of the refrigerant, the evaporator 70 is cool relative to compartments 14 and 18 of the refrigerator appliance 10. As such, cooled air is produced and refrigerates compartments 14 and 18 of refrigerator appliance 10. Thus, the evaporator 70 is a type of heat exchanger which transfers heat from air passing over the evaporator 70 to refrigerant flowing through the evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
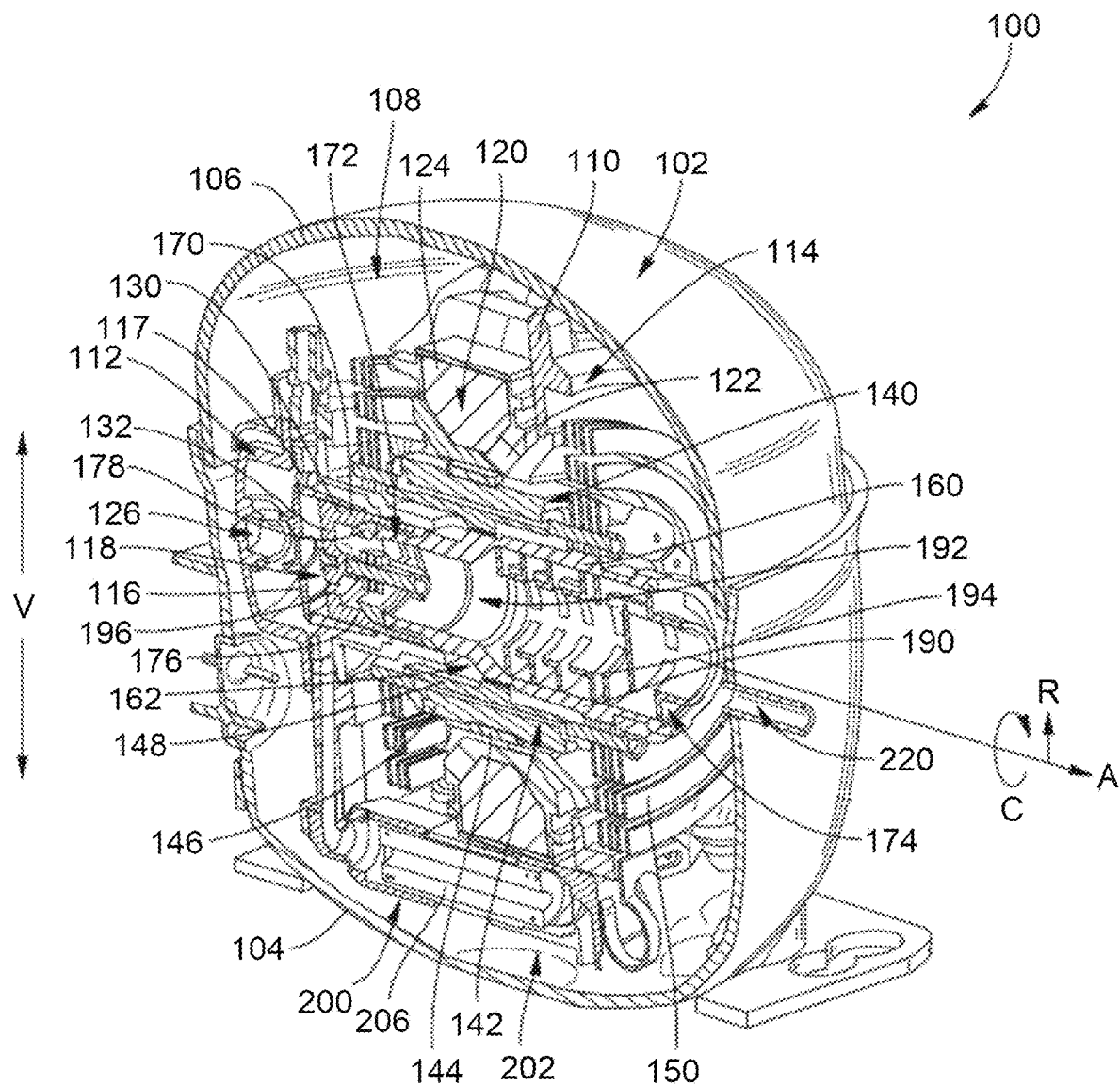
FIG. 3 is a perspective, section view of a linear compressor according to an exemplary embodiment of the present subject matter.
Figure 4:
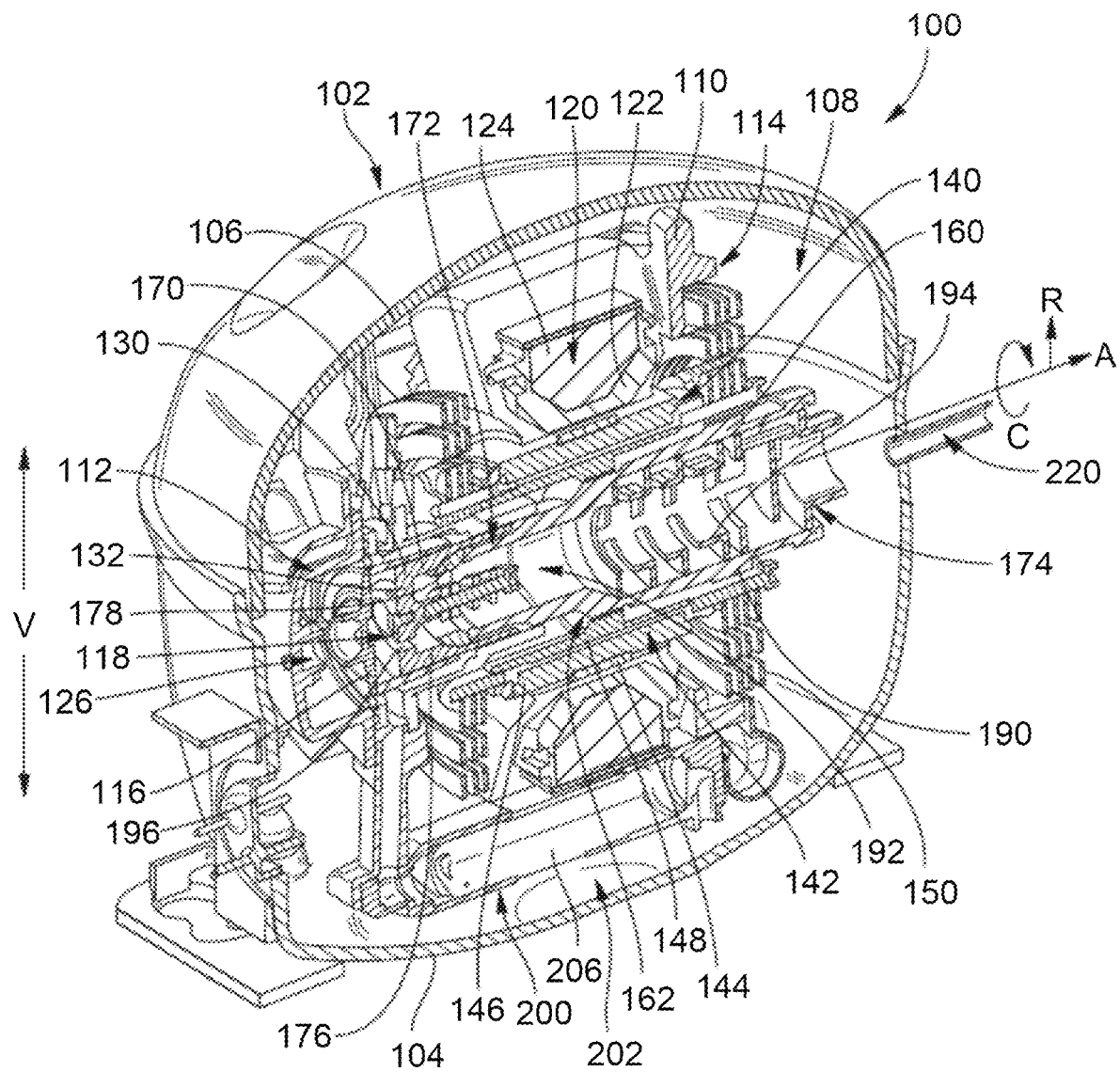
FIG. 4 is another perspective, section view of the exemplary linear compressor of FIG. 3 according to an embodiment of the present subject matter.
Figure 5:
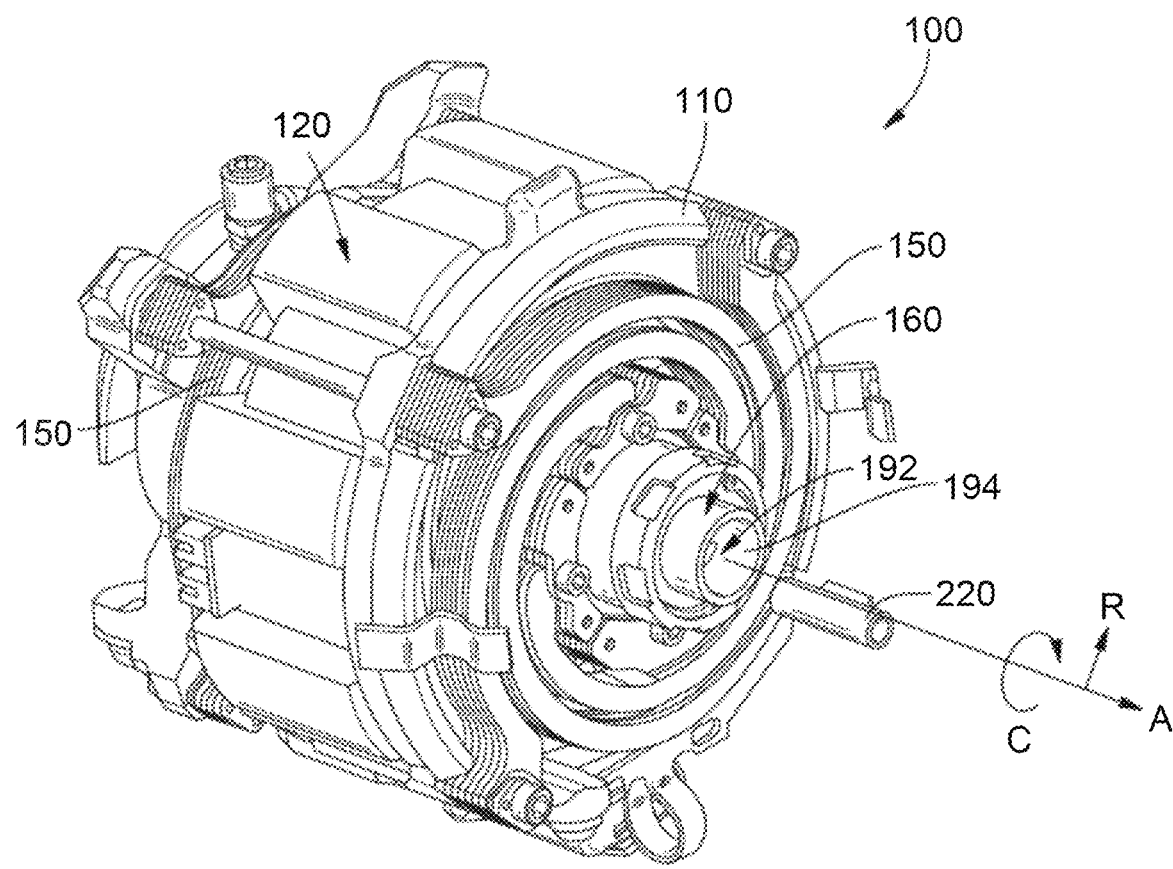
FIG. 5 is a perspective view of a linear compressor with a compressor housing removed for clarity according to an example embodiment of the present subject matter.
Figure 6:
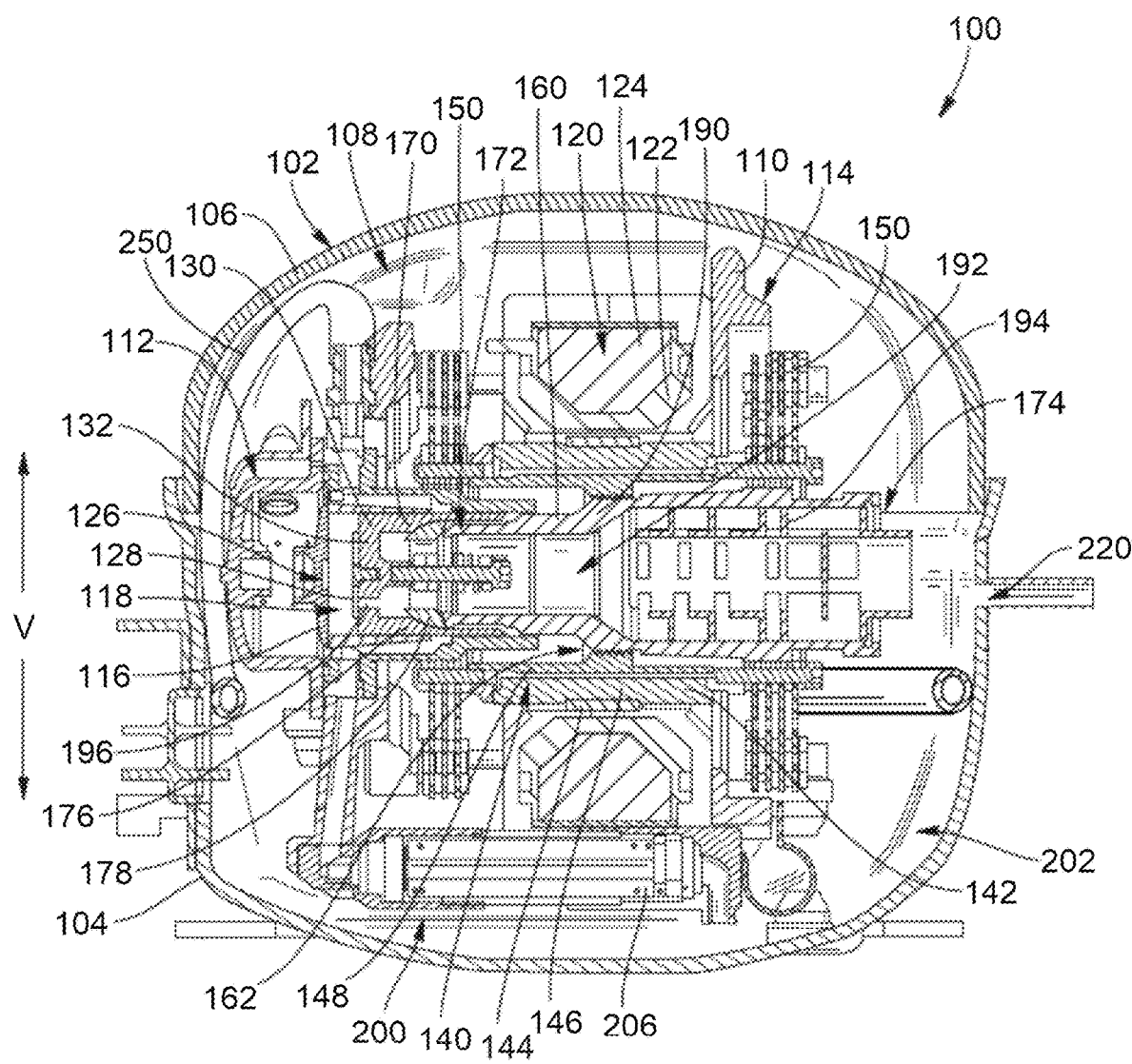
FIG. 6 is a section view of the exemplary linear compressor of FIG. 3 with a piston in an extended position according to an embodiment of the present subject matter.
Figure 7:
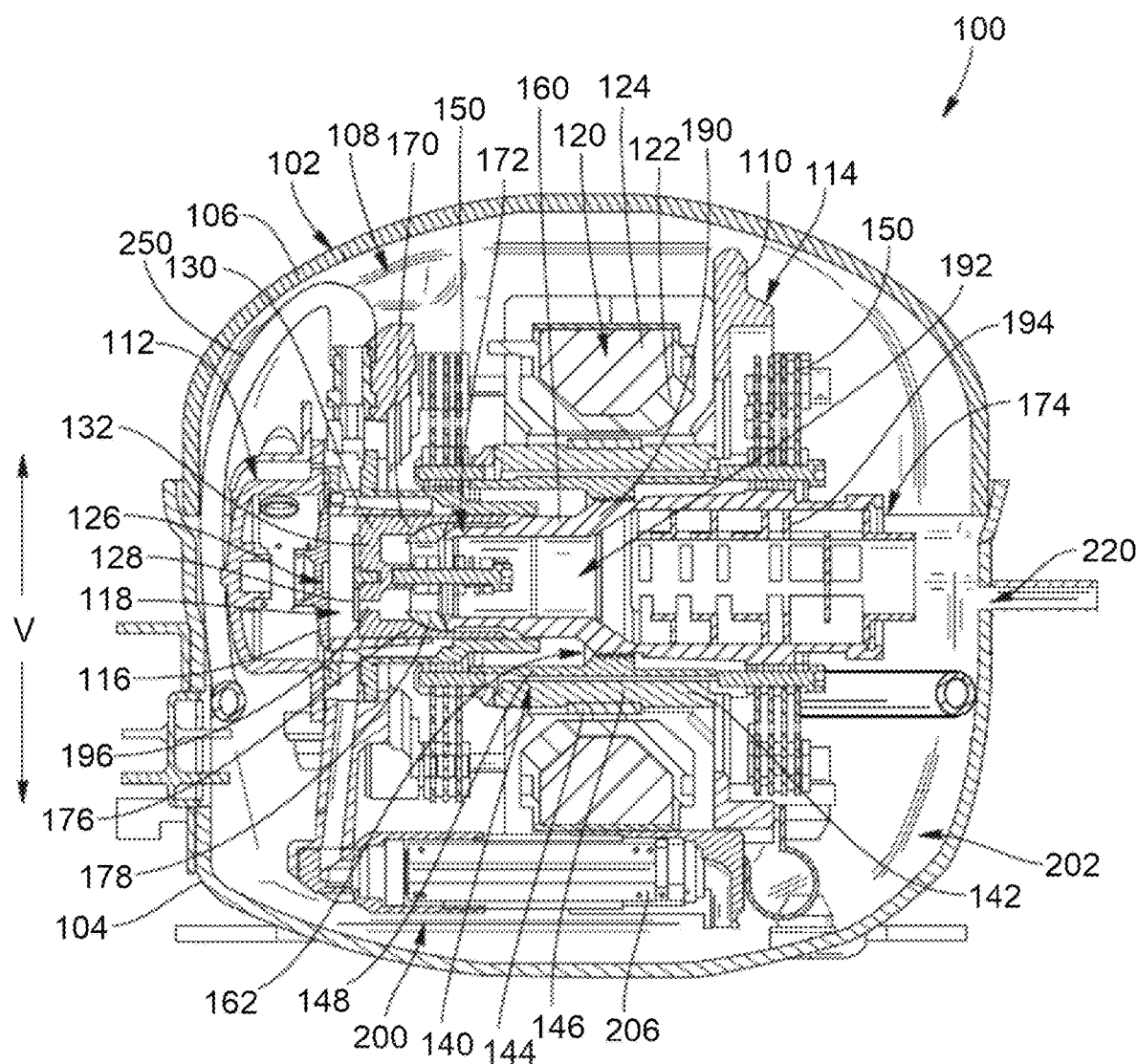
FIG. 7 is a section view of the exemplary linear compressor of FIG. 3 with the piston in a retracted position according to an embodiment of the present subject matter.

Referring now generally to FIGS. 3 through 7, a linear compressor 100 is described according to exemplary embodiments of the present subject matter. Specifically, FIGS. 3 and 4 provide perspective, section views of the linear compressor 100, FIG. 5 provides a perspective view of the linear compressor 100 with a compressor shell or housing 102 removed for clarity, and FIGS. 6 and 7 provide section views of the linear compressor when a piston thereof is in extended and retracted positions, respectively. It should be appreciated that the linear compressor 100 is used herein only as an exemplary embodiment to facilitate the description of aspects of the present subject matter. Modifications and variations may be made to the linear compressor 100 while remaining within the scope of the present subject matter.

As illustrated for example in FIGS. 3 and 4, the housing 102 may include a lower portion or lower housing 104 and an upper portion or upper housing 106 which are joined together to form a substantially enclosed cavity 108 for housing various components of linear compressor 100. Specifically, for example, cavity 108 may be a hermetic or air-tight shell that can house working components of linear compressor 100 and may hinder or prevent refrigerant from leaking or escaping from refrigeration system 60. In addition, linear compressor 100 generally defines an axial direction A, a radial direction R, and a circumferential direction C. It should be appreciated that linear compressor 100 is described and illustrated herein only to describe aspects of the present subject matter. Variations and modifications to linear compressor 100 may be made while remaining within the scope of the present subject matter.

Referring particularly to FIGS. 3 through 7, various parts and working components of the linear compressor 100 will be described according to an exemplary embodiment. As shown, the linear compressor 100 includes a casing 110 that extends between a first end portion 112 and a second end portion 114, e.g., along the axial direction A. The casing 110 includes a cylinder 117 that defines a chamber 118. The cylinder 117 is positioned at or adjacent first end portion 112 of casing 110. The chamber 118 extends longitudinally along the axial direction A. As discussed in greater detail below, the linear compressor 100 is operable to increase a pressure of fluid within chamber 118 of linear compressor 100. Further, the linear compressor 100 may be used to compress any suitable fluid, such as refrigerant or air. In particular, the linear compressor 100 may be used in a refrigerator appliance, such as refrigerator appliance 10 (FIG. 1) in which the linear compressor 100 may be used as compressor 64 (FIG. 2).

Moreover, as shown, the linear compressor 100 includes a stator 120 of a motor 808 (FIG. 8) that is mounted or secured to casing 110. For example, stator 120 generally includes an outer back iron 122 and a driving coil 124 that extend about the circumferential direction C within casing 110. The linear compressor 100 also includes one or more valves that permit refrigerant to enter and exit chamber 118 during operation of linear compressor 100. For example, a discharge muffler 126 is positioned at an end of chamber 118 for regulating the flow of refrigerant out of chamber 118, while a suction valve 128 (shown only in FIGS. 6-7 for clarity) regulates flow of refrigerant into chamber 118.

A piston 130 with a piston head 132 is slidably received within chamber 118 of cylinder 117. In particular, piston 130 is slidable along the axial direction A. During sliding of piston head 132 within chamber 118, piston head 132 compresses refrigerant within chamber 118. As an example, from a top dead center position (see, e.g., FIG. 6), piston head 132 can slide within chamber 118 towards a bottom dead center position (see, e.g., FIG. 7) along the axial direction A, i.e., an expansion stroke of piston head 132. When piston head 132 reaches the bottom dead center position, piston head 132 changes directions and slides in chamber 118 back towards the top dead center position, i.e., a compression stroke of piston head 132. It should be understood that the linear compressor 100 may include an additional piston head and/or additional chambers at an opposite end of linear compressor 100. Thus, linear compressor 100 may have multiple piston heads in alternative exemplary embodiments.

As illustrated, the linear compressor 100 also includes a mover 140 which is generally driven by stator 120 for compressing refrigerant. Specifically, for example, mover 140 may include an inner back iron 142 positioned in stator 120 of the motor 808. In particular, outer back iron 122 and/or driving coil 124 may extend about inner back iron 142, e.g., along the circumferential direction C. Inner back iron 142 also has an outer surface that faces towards outer back iron 122 and/or driving coil 124. At least one driving magnet 144 is mounted to inner back iron 142, e.g., at the outer surface of inner back iron 142.

Driving magnet 144 may face and/or be exposed to driving coil 124. In particular, driving magnet 144 may be spaced apart from driving coil 124, e.g., along the radial direction R by an air gap. Thus, the air gap may be defined between opposing surfaces of driving magnet 144 and driving coil 124. Driving magnet 144 may also be mounted or fixed to inner back iron 142 such that an outer surface of driving magnet 144 is substantially flush with the outer surface of inner back iron 142. Thus, driving magnet 144 may be inset within inner back iron 142. In such a manner, the magnetic field from driving coil 124 may have to pass through only a single air gap between outer back iron 122 and inner back iron 142 during operation of the linear compressor 100, and the linear compressor 100 may be more efficient relative to linear compressors with air gaps on both sides of a driving magnet.

As may be seen in FIG. 3, the driving coil 124 extends about inner back iron 142, e.g., along the circumferential direction C. In alternative example embodiments, inner back iron 142 may extend around driving coil 124 along the circumferential direction C. The driving coil 124 is operable to move the inner back iron 142 along the axial direction A during operation of driving coil 124. As an example, a current may be induced within driving coil 124 by a current source (not shown) to generate a magnetic field that engages driving magnet 144 and urges piston 130 to move along the axial direction A in order to compress refrigerant within chamber 118 as described above and will be understood by those skilled in the art. In particular, the magnetic field of driving coil 124 may engage driving magnet 144 in order to move inner back iron 142 and piston head 132 along the axial direction A during operation of driving coil 124. Thus, the driving coil 124 may slide the piston 130 between the top dead center position and the bottom dead center position, e.g., by moving inner back iron 142 along the axial direction A, during operation of driving coil 124.

Figure 8:
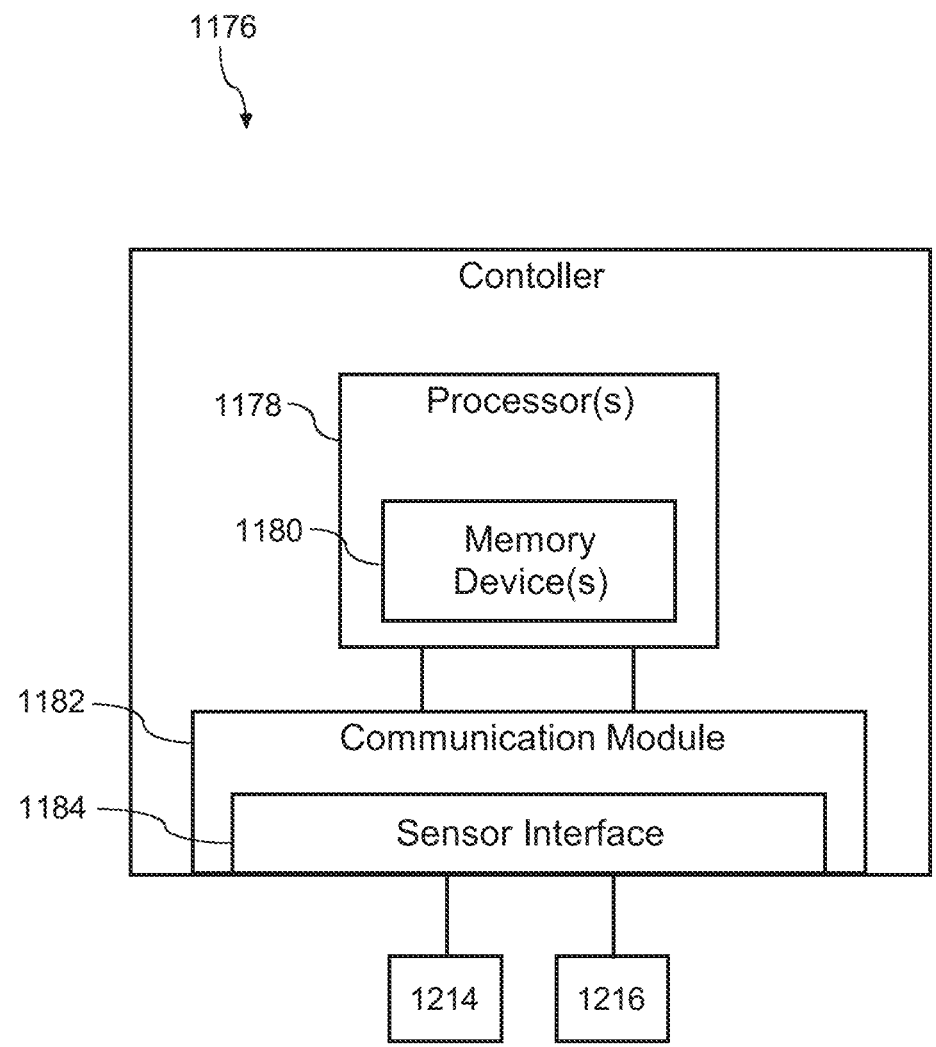
FIG. 8 provides a block diagram of one embodiment of a controller of a refrigerator appliance according to example embodiments of the present disclosure.

Referring particularly to FIG. 8, operation of the refrigerator appliance 10 may generally be controlled by a processing device or controller 1176. The controller 1176 may, for example, be operatively coupled to the control panel 24 for user manipulation to select features and operations of the refrigerator appliance 10, such as temperature set points. Thus, the controller 1176 can operate various components of the refrigerator appliance 10 to execute selected system cycles, processes, and/or features. In exemplary embodiments, the controller 1176 is in operative communication (e.g., electrical or wireless communication) with each of the chambers or compartments therein, for example, to regulate temperature as described herein.

More specifically, as shown in FIG. 8, a block diagram of one embodiment of suitable components that may be included within the controller 1176 in accordance with example aspects of the present disclosure is illustrated. As shown, the controller 1176 may include one or more processor(s) 1178, computer, or other suitable processing unit and associated memory device(s) 1180 that may include suitable computer-readable instructions that, when implemented, configure the controller to perform various different functions, such as receiving, transmitting and/or executing signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 1180 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. The memory can be a separate component from the processor or can be included onboard within the processor.

Such memory device(s) 1180 may generally be configured to store suitable computer-readable instructions that, when implemented by the processor(s) 1178, configure the controller to perform various functions as described herein. In particular, the processor(s) 1178 can include microprocessors, CPUs or the like, such as general or special purpose microprocessors operable to execute programming instructions or micro-control code associated with operation of the linear compressor 100. Additionally, the controller 1176 may also include a communications module 1182 to facilitate communications between the controller and the various components of the refrigerator appliance 10. An interface can include one or more circuits, terminals, pins, contacts, conductors, or other components for sending and receiving control signals. Moreover, the controller 1176 may include a sensor interface 1184 (e.g., one or more analog-to-digital converters) to permit signals transmitted from the temperature probe(s) 1214 to be converted into signals that can be understood and processed by the processor(s) 1178. The controller 1176 may furthermore optionally receive a second temperature signal(s) from the thermistor(s) 1216 configured to generate one or more second temperature signals representative of the actual temperature of the item or the chamber.

Alternatively, the controller 1176 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The inner back iron 142 further includes an outer cylinder 146 and an inner sleeve 148. The outer cylinder 146 defines the outer surface of inner back iron 142 and also has an inner surface positioned opposite the outer surface of outer cylinder 146. The inner sleeve 148 is positioned on or at inner surface of outer cylinder 146. A first interference fit between outer cylinder 146 and inner sleeve 148 may couple or secure outer cylinder 146 and inner sleeve 148 together. In alternative exemplary embodiments, inner sleeve 148 may be welded, glued, fastened, or connected via any other suitable mechanism or method to outer cylinder 146.

The outer cylinder 146 may be constructed of or with any suitable material. For example, outer cylinder 146 may be constructed of or with a plurality of (e.g., ferromagnetic) laminations. The laminations are distributed along the circumferential direction C in order to form outer cylinder 146 and are mounted to one another or secured together, e.g., with rings pressed onto ends of the laminations. The outer cylinder 146 may define a recess that extends inwardly from the outer surface of outer cylinder 146, e.g., along the radial direction R. The driving magnet 144 is positioned in the recess on outer cylinder 146, e.g., such that the driving magnet 144 is inset within outer cylinder 146.

The linear compressor 100 also includes a pair of planar springs 150. Each planar spring 150 may be coupled to a respective end of inner back iron 142, e.g., along the axial direction A. During operation of driving coil 124, planar springs 150 support inner back iron 142. In particular, the inner back iron 142 is suspended by planar springs 150 within the stator or the motor 808 of the linear compressor 100 such that motion of inner back iron 142 along the radial direction R is hindered or limited while motion along the axial direction A is relatively unimpeded. Thus, the planar springs 150 may be substantially stiffer along the radial direction R than along the axial direction A. In such a manner, planar springs 150 can assist with maintaining a uniformity of the air gap between driving magnet 144 and driving coil 124, e.g., along the radial direction R, during operation of the motor 808 and movement of inner back iron 142 on the axial direction A. The planar springs 150 can also assist with hindering side pull forces of the motor 808 from transmitting to piston 130 and being reacted in cylinder 117 as a friction loss.

A flex mount 160 is mounted to and extends through inner back iron 142. In particular, the flex mount 160 is mounted to inner back iron 142 via inner sleeve 148. Thus, the flex mount 160 may be coupled (e.g., threaded) to inner sleeve 148 at the middle portion of inner sleeve 148 and/or flex mount 160 in order to mount or fix flex mount 160 to inner sleeve 148. The flex mount 160 may assist with forming a coupling 162. The coupling 162 connects inner back iron 142 and piston 130 such that motion of inner back iron 142, e.g., along the axial direction A, is transferred to piston 130.

The coupling 162 may be a compliant coupling that is compliant or flexible along the radial direction R. In particular, coupling 162 may be sufficiently compliant along the radial direction R such that little or no motion of inner back iron 142 along the radial direction R is transferred to piston 130 by coupling 162. In such a manner, side pull forces of the motor 808 are decoupled from piston 130 and/or cylinder 117 and friction between piston 130 and cylinder 117 may be reduced.

As may be seen in the figures, the piston head 132 of piston 130 has a piston cylindrical side wall 170. The cylindrical side wall 170 may extend along the axial direction A from piston head 132 towards inner back iron 142. An outer surface of cylindrical side wall 170 may slide on cylinder 117 at chamber 118 and an inner surface of cylindrical side wall 170 may be positioned opposite the outer surface of cylindrical side wall 170. Thus, the outer surface of cylindrical side wall 170 may face away from a center of cylindrical side wall 170 along the radial direction R, and the inner surface of cylindrical side wall 170 may face towards the center of cylindrical side wall 170 along the radial direction R.

The flex mount 160 extends between a first end portion 172 and a second end portion 174, e.g., along the axial direction A. According to an exemplary embodiment, the inner surface of cylindrical side wall 170 defines a ball seat 176 proximate first end portion. In addition, coupling 162 also includes a ball nose 178. Specifically, for example, the ball nose 178 is positioned at first end portion 172 of flex mount 160, and ball nose 178 may contact flex mount 160 at first end portion 172 of flex mount 160. In addition, ball nose 178 may contact piston 130 at ball seat 176 of piston 130. In particular, ball nose 178 may rest on ball seat 176 of piston 130 such that ball nose 178 is slidable and/or rotatable on ball seat 176 of piston 130. For example, ball nose 178 may have a frusto-spherical surface positioned against ball seat 176 of piston 130, and ball seat 176 may be shaped complementary to the frusto-spherical surface of ball nose 178. The frusto-spherical surface of ball nose 178 may slide and/or rotate on ball seat 176 of piston 130.

Relative motion between the flex mount 160 and the piston 130 at the interface between ball nose 178 and ball seat 176 of piston 130 may provide reduced friction between piston 130 and cylinder 117, e.g., compared to a fixed connection between flex mount 160 and piston 130. For example, when an axis on which piston 130 slides within cylinder 117 is angled relative to the axis on which inner back iron 142 reciprocates, the frusto-spherical surface of ball nose 178 may slide on ball seat 176 of piston 130 to reduce friction between piston 130 and cylinder 117 relative to a rigid connection between inner back iron 142 and piston 130.

Further, as shown, the flex mount 160 is connected to the inner back iron 142 away from first end portion 172 of flex mount 160. For example, flex mount 160 may be connected to inner back iron 142 at second end portion 174 of flex mount 160 or between first and second end portions 172, 174 of flex mount 160. Conversely, the flex mount 160 is positioned at or within piston 130 at first end portion 172 of flex mount 160, as discussed in greater detail below.

In addition, the flex mount 160 includes a tubular wall 190 between inner back iron 142 and piston 130. A channel 192 within tubular wall 190 is configured for directing compressible fluid, such as refrigerant or air, though flex mount 160 towards piston head 132 and/or into piston 130. Inner back iron 142 may be mounted to flex mount 160 such that inner back iron 142 extends around tubular wall 190, e.g., at the middle portion of flex mount 160 between first and second end portions 172, 174 of flex mount 160. Channel 192 may extend between first and second end portions 172, 174 of flex mount 160 within tubular wall 190 such that the compressible fluid is flowable from first end portion 172 of flex mount 160 to second end portion 174 of flex mount 160 through channel 192. In such a manner, compressible fluid may flow through inner back iron 142 within flex mount 160 during operation of the linear compressor 100. A muffler 194 may be positioned within channel 192 within tubular wall 190, e.g., to reduce the noise of compressible fluid flowing through channel 192.

The piston head 132 also defines at least one opening 196. Opening 196 of piston head 132 extends, e.g., along the axial direction A, through piston head 132. Thus, the flow of fluid may pass through piston head 132 via opening 196 of piston head 132 into chamber 118 during operation of the linear compressor 100. In such a manner, the flow of fluid (that is compressed by piston head 132 within chamber 118) may flow within channel 192 through flex mount 160 and inner back iron 142 to piston 130 during operation of the linear compressor 100. As explained above, suction valve 128 (FIGS. 6-7) may be positioned on piston head 132 to regulate the flow of compressible fluid through opening 196 into chamber 118.

Referring still to FIGS. 3 through 7, the linear compressor 100 may also include a lubrication system 200 for circulating a lubricant, e.g., such as oil, through the working or moving components of the linear compressor 100 to reduce friction, improve efficiency, etc. For example, as shown, the housing 102 may generally defines a sump 202 which is configured for collecting oil. Specifically, the sump 202 may be defined in the bottom portion of lower housing 104. The lubrication system 200 further includes a pump 206 for continuously circulating oil through components of the linear compressor 100 which need lubrication.

As also illustrated in the figures, the linear compressor 100 may include a suction inlet 220 for receiving a flow of refrigerant. Specifically, as shown, the suction inlet 220 may be defined on the housing 102 (e.g., such as on lower housing 104), and may be configured for receiving a refrigerant supply conduit to provide refrigerant to the cavity 108. As explained above, the flex mount 160 includes tubular wall 190, which defines channel 192 for directing compressible fluid, such as refrigerant gas, through flex mount 160 towards piston head 132. In this manner, desirable flow path of refrigerant gas is through suction inlet 220, through channel 192, through opening 196, and into chamber 118.

Suction valve 128 may block opening 196 during a compression stroke and a discharge valve 116 may permit the compressed gas to exit chamber 118 when the desired pressure is reached.

Figure 9:
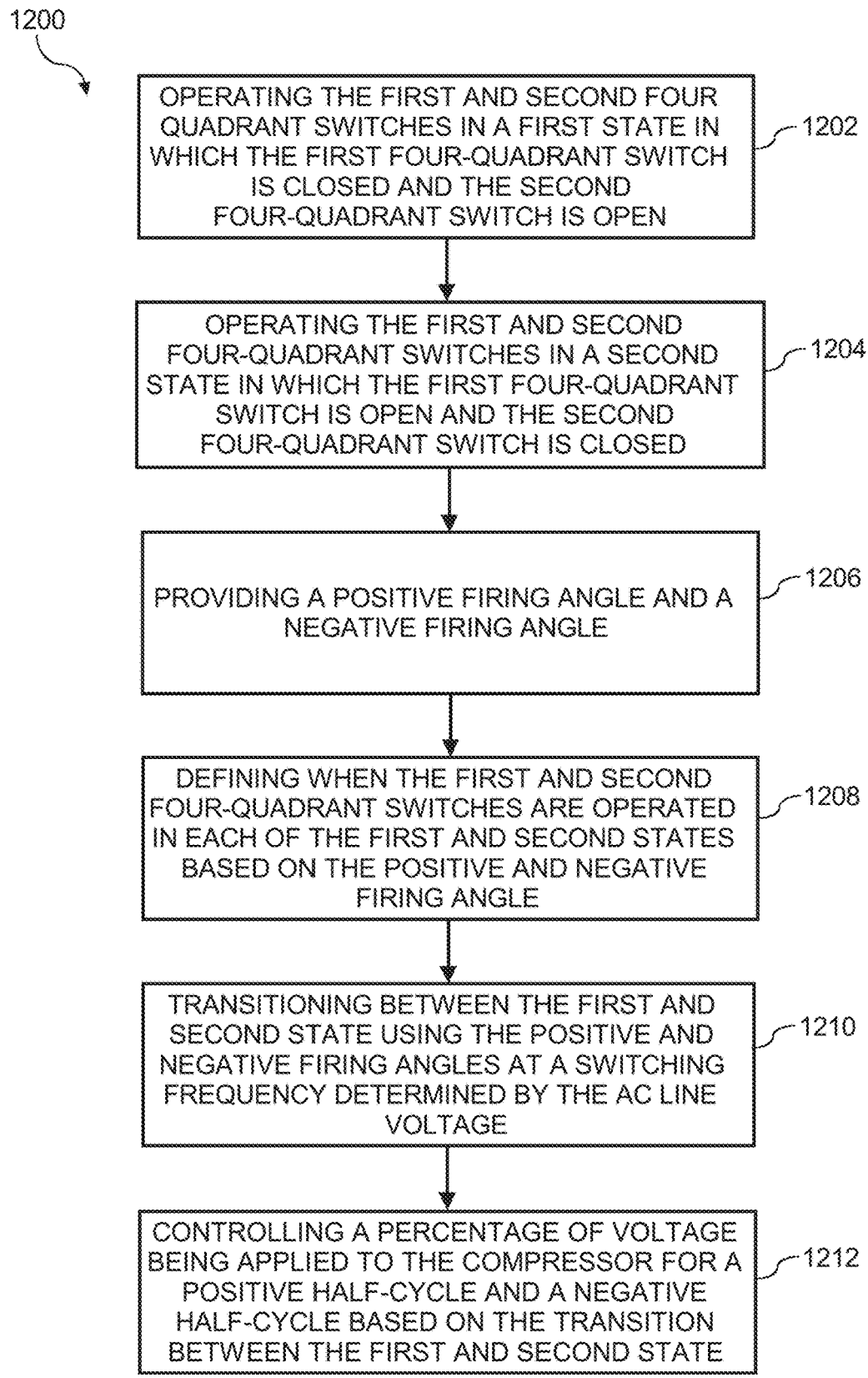
FIG. 9 provides a schematic diagram of a method for operating a variable capacity drive circuit of a compressor according to example embodiments of the present disclosure.

Referring now to FIG. 9, a flow diagram of one embodiment of a method 1200 for operating a variable capacity drive circuit of a compressor of a refrigerator appliance is provided. In general, the method 1200 is described herein with reference to the refrigerator appliance 10 and assembly 100 of FIGS. 1-7. However, it should be appreciated that the disclosed method 1200 may be implemented with any other suitable refrigerator appliance having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (1202), the method 1200 includes operating the first and second four-quadrant switches in a first state in which the first four-quadrant switch is closed and the second four-quadrant switch is open such that a voltage seen by the motor is equal to an AC line voltage.

As shown in (1204), the method 1220 includes operating the first and second four-quadrant switches in a second state in which the first four-quadrant switch is open and the second four-quadrant switch is closed such that the voltage seen by the motor is to zero.

Still referring to FIG. 9, as shown in (1206), the method 1200 includes providing a positive firing angle and a negative firing angle. As shown at (1208), the method 1200 includes defining when the first and second four-quadrant switches are operated in each of the first and second states based on the positive and negative firing angle. As shown at (1210), the method 1200 includes transitioning between the first and second state using the positive and negative firing angles at a switching frequency determined by the AC line voltage frequency. As shown at (1212), the method 1200 includes controlling a percentage of voltage being applied to the compressor for a positive half-cycle and a negative half-cycle based on the transition between the first and second state.

Figure 10:
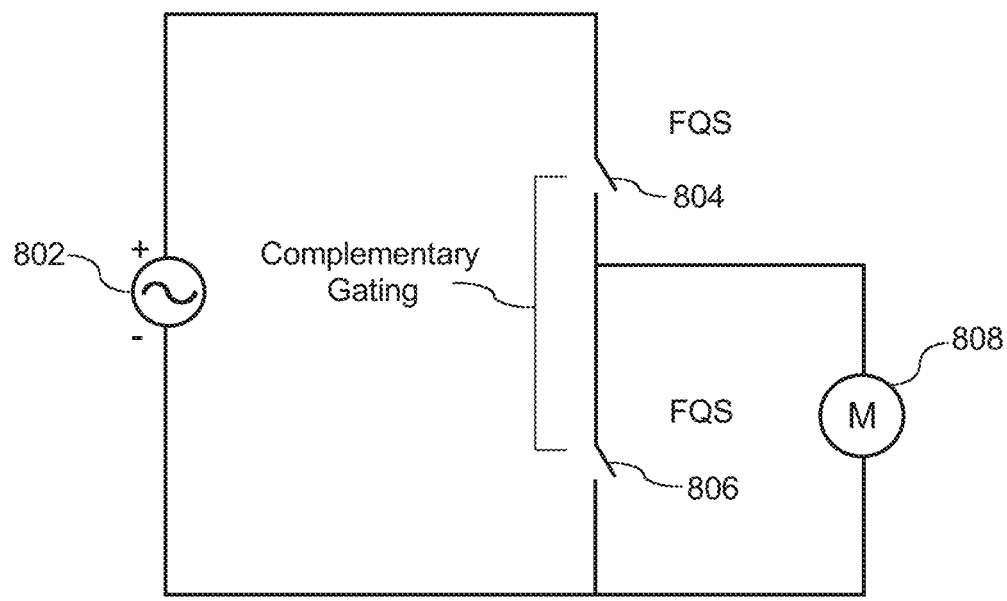
FIG. 10 is a schematic diagram of an exemplary linear compressor drive circuit according to an embodiment of the present subject matter.
Figure 11:
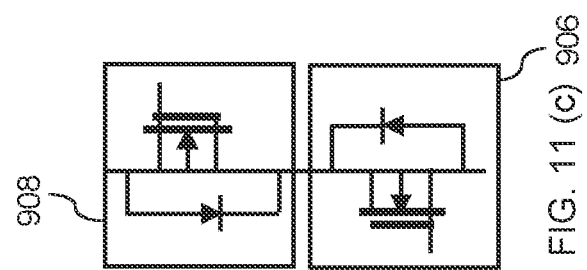
FIG. 11(*a*) is a schematic diagram of one embodiment of a four-quadrant switch configuration according to an embodiment of the present subject matter.
Figure 11:
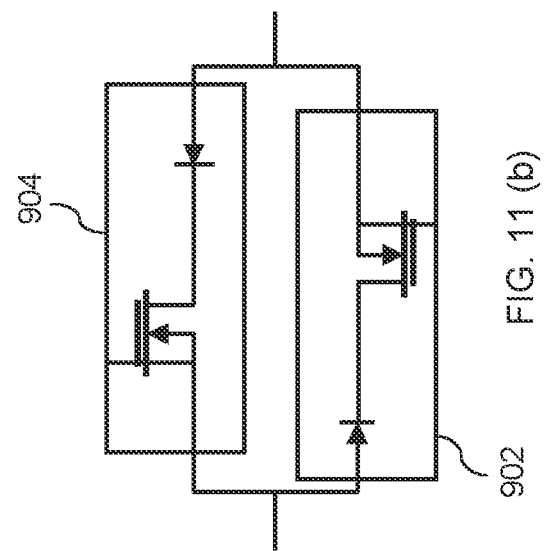
Figure 11:
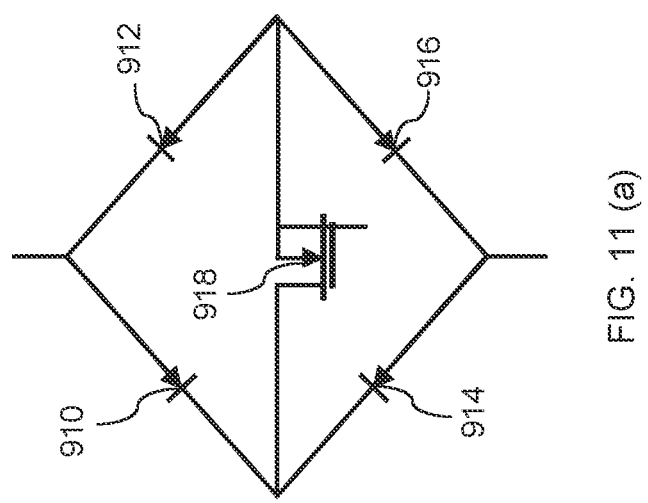

The method 1200 of FIG. 9 can be better understood with respect to FIGS. 10, 11(*a*)-11(*d*), and 12(*a*)-12(*d*). In particular, the linear compressor 100 may further include features for controlling voltage applied to the linear compressor 100. Specifically, according to exemplary embodiments, the linear compressor 100 may be driven by a variable capacity drive circuit 800 for controlling voltage being applied to the stator 120. Although an exemplary drive circuit 800 is described herein, it should be appreciated that variations and modifications to the variable capacity drive circuit 800 may be used while remaining within the scope of the present subject matter.

According to the illustrated embodiment, as shown in FIG. 10, the variable capacity drive circuit 800 includes a plurality of four-quadrant switches (e.g., a first four-quadrant switch 804 and a second four-quadrant switch 806) arranged in a totem pole configuration, between an AC line voltage 802 of the linear compressor and the motor 808. For purposes of explaining aspects of the present subject matter, the variable capacity drive circuit 800 is described below as being used with the stator 120 of the linear compressor 100. However, it should be appreciated that aspects of the variable capacity drive circuit 800 may be used in other compressors while remaining within the scope of the present subject matter.

In general, the variable capacity drive circuit 800 (e.g., in a refrigeration appliance) includes at least the first four-quadrant switch 804 and the second four-quadrant switch 806. Further, as shown particularly in FIGS. 11(*a*), 11(*b*), and 11(*c*), the four-quadrant switches may have any suitable configurations. In one example, as shown in FIG. 11(*a*), four diodes (e.g., first diode 910, second diode 912, third diode 914, and fourth diode 916) can be used to connect a transistor 918 in either direction as appropriate to direct current in either direction. Moreover, when the transistor 918 is off, the switch network can block either polarity of voltage.

In another example, as shown in FIG. 11(*b*), a first voltage bi-directional switch 902 and a second voltage bi-directional switch 904 are used. In such embodiments, the first voltage bi-directional switch 902 and the second voltage bi-directional switch 904 are two-quadrant and can be put in parallel such that either switch can block either polarity of voltage. Moreover, the first voltage bi-directional switch 902 can conduct negative current while the second voltage bi-directional switch 904 can conduct positive current. Thus, in combination the first voltage bi-directional switch 902 and the second voltage bi-directional switch 904 can conduct any polarity of current.

In yet another example, as shown in FIG. 11(*c*), a first current bi-directional switch 906 and a second current bi-directional switch 908 are used. The first current bi-directional switch 906 and the second current bi-directional switch 908 can be placed in series such that both the first current bi-directional switch 906 and the second current bi-directional switch 908 can conduct current of both polarities. Moreover, the first current bi-directional switch 906 can only block negative voltage while the second current bi-directional switch 908 can only block positive voltage. Thus, by placing the first current bi-directional switch 906 and the second current bi-directional switch 908 in series, both polarities of voltage may be blocked.

Further, the four-quadrant switches 804, 806 described herein can be operated in multiple states. For example, in an embodiment, the first four-quadrant switch 804 and the second four-quadrant switch 806 can opened and closed in different combinations. More specifically, according to one exemplary embodiment, the variable capacity drive circuit 800 operates first four-quadrant switch 804 and the second four-quadrant switch 806 in a first state in which the first four-quadrant switch 804 is closed and the second four-quadrant switch 806 is open. In such embodiments, the voltage seen by the motor 808 is equal to an AC line voltage 802. As another exemplary embodiment, the variable capacity drive circuit 800 can operate in a second state in which the first four-quadrant switch 804 is open and the second four-quadrant switch 806 is closed. In such embodiments, the voltage seen by the motor 808 is equal to zero.

Figure 12:
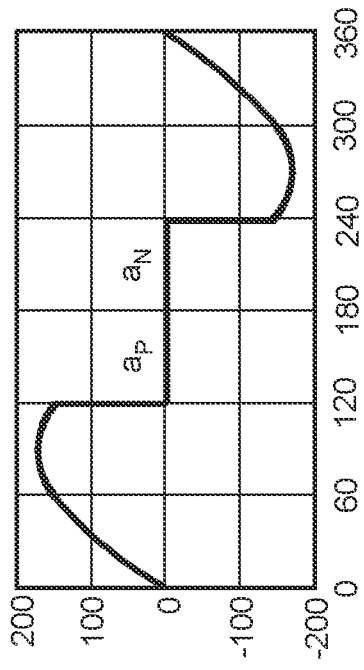
FIG. 12(*a*) illustrates a graph of an application of firing angles to transition a variable capacity drive circuit between a first state and a second state according to an embodiment of the present subject matter.
Figure 12:
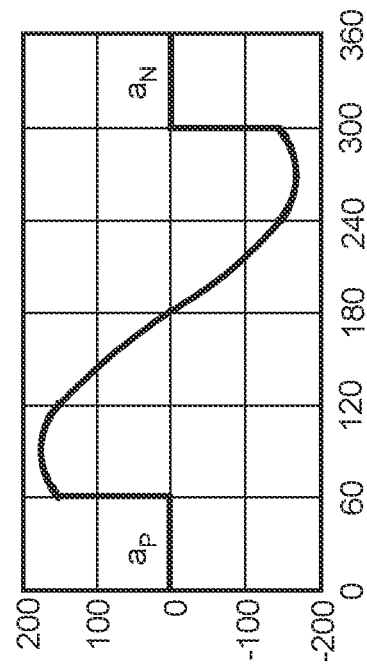
Figure 12:
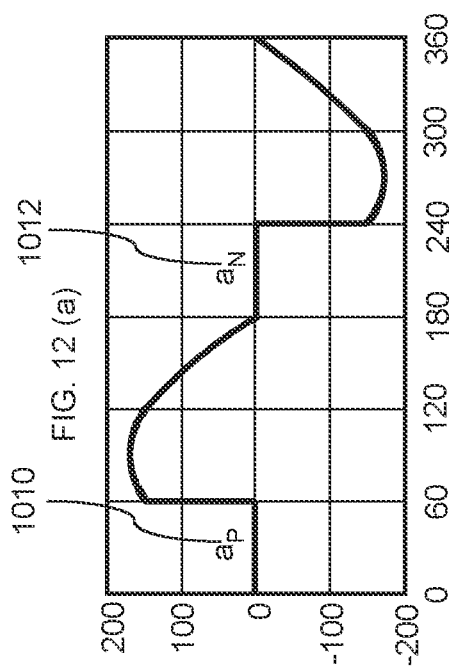
Figure 12:
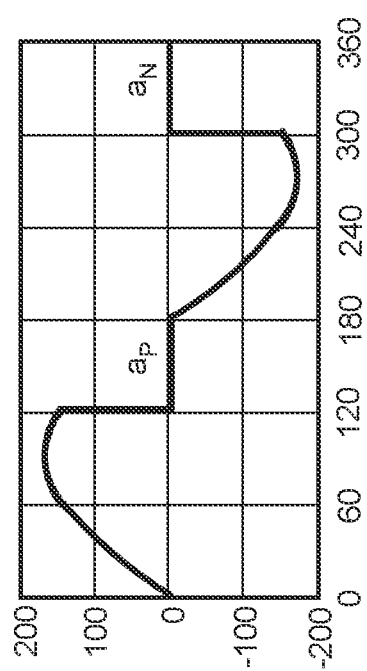

Referring now particularly to FIGS. 12(*a*) through 12(*d*), as the four-quadrant switches 804, 806 are operated in multiple states, a positive firing angle 1010 and a negative firing angle 1012 can be provided by the controller 1176. For example, the positive firing angle 1010 and the negative firing angle 1012 may define when the first four-quadrant switch 804 and the second four-quadrant switch 806 are operated in each of the first and second states.

As a further example, the positive firing angle 1010 and the negative firing angle 1012 may be used to transition between the first and second states. Specifically, in an embodiment, the controller 1176 may transition between the first state and the second state using the positive and negative firing angles 1010, 1012 at a switching frequency determined by the AC line voltage frequency so as to control a percentage of voltage being applied to the compressor 100 for a positive half-cycle 1014 and a negative half-cycle 1016. In particular, the first four-quadrant switch 804 and the second four-quadrant switch 806 may transition between the first state and the second state a maximum of two transitions per half-cycle.

In particular embodiments, for example, the switching frequency may be equal to a low frequency value per half-cycle. For example, in an embodiment, the switching frequency may be equal to or less than about 60 Hz per half-cycle. More particularly, in an embodiment, the switching frequency may be synchronized to the AC line voltage such that the state of the four-quadrant switches transitions, at most, twice per half-cycle. In this example, the switching frequency is essentially two times the line voltage frequency (e.g. 120 Hz), at least if the firing angles are arranged as shown in FIGS. 12(a) and (c). In such embodiments, if the switching occurs as shown in FIGS. 12(b) and (d), the actual switching frequency is equal to 60 Hz. Furthermore, in an embodiment, the switching times can be determined by the firing angles. Moreover, in an embodiment, the timing between switching, specifically the firing angles, between the first and second states may be used to modulate the voltage applied to the motor 808. Further, the voltage applied to the motor 808 can include an AC component, specifically where the AC component includes multiple harmonics beyond the AC line voltage frequency, contributing to the total harmonic distortion, and a direct current (DC) component. In particular, the positive firing angle 1010 and the negative firing angle 1012 may include different modulation levels for each of the positive half-cycle 1014 and the negative half-cycle 1016, respectively. As such, the different modulation levels may induce the AC component and the DC component of the voltage in the motor 808.

In addition, according to exemplary embodiments, the timing between switching between the first and second states, i.e. the positive and negative firing angles, can further include using the DC component of the voltage to bias a point of oscillation. In particular, the DC component of the voltage can be used to bias a center point of oscillation, for example, of a piston 130 of the compressor (e.g., to minimize a top dead center volume of the piston 130). The difference between the positive and negative firing angles may be used to modulate the voltage applied to the motor 808 can further include using the AC component of the voltage to modulate a capacity of the compressor. In particular, the AC component of the voltage can be used to modulate a capacity of the compressor via a stroke length of the piston 130.

In addition, according to exemplary embodiments, the positive firing angle 1010 and the negative firing angle 1012 may be applied at particular times during the half-cycle. In particular, the positive firing angle 1010 and the negative firing angle 1012 can be applied relative to zero-crossings of the AC line voltage. In one example, the positive firing angle 1010 and the negative firing angle 1012 may be applied at a beginning or end of a half-cycle as shown in FIG. 12(a), FIG. 12(b), FIG. 12(c), and FIG. 12(d). Applying the positive firing angle 1010 and the negative firing angle 1012 at particular times during the half-cycle can minimize an effect on a total harmonic distortion of the AC component.

Referring now, in particular, to FIG. 12(a), the positive firing angle 1010 may be applied at the beginning of the positive half-cycle and the negative firing angle 1012 may be applied at the beginning of the negative half-cycle.

Referring now, in particular, to FIG. 12(c), the positive firing angle 1010 may be applied at the end of the positive half-cycle and the negative firing angle 1012 may be applied at the end of the negative half-cycle.

In addition, according to exemplary embodiments, the positive firing angle 1010 and the negative firing angle 1012 may be applied such that the two second states are consecutive. Referring now, in particular, to FIG. 12(b), the positive firing angle 1010 can be applied at an end of the positive half-cycle and the negative firing angle 1012 can be applied at the beginning of the negative half-cycle 1004. Referring now, in particular, to FIG. 12(d), the positive firing angle 1010 can be applied at an beginning of the positive half-cycle and the negative firing angle 1012 can be applied at the end of the negative half-cycle 1008. As illustrated in FIG. 12(b) and FIG. 12(d), applying the positive firing angle 1010 and the negative firing angle 1012 such that the two second states are consecutive can reduce the switching frequency.

In addition, according to exemplary embodiments the positive firing angle 1010 and the negative firing angle 1012 may be altered. Specifically, the positive firing angle 1010 and the negative firing angle 1012 may be increased. For example, the positive firing angle 1010 and the negative firing angle 1012 be increased equally. Altering the positive firing angle 1010 and the negative firing angle 1012 may reduce the AC component of the voltage in the motor 808. Additionally, or alternatively, altering the positive firing angle 1010 and the negative firing angle 1012 may reduce the DC component of the voltage in the motor 808. As another example, a difference may be injected in the positive firing angle 1010 and the negative firing angle 1012. The difference between the positive firing angle 1010 and the negative firing angle 1012 may control the DC component of the voltage applied to the motor 808.

In addition, according to exemplary embodiments a standard operating mode of the compressor can define a resonant frequency. Specifically, the standard operating mode of the compressor can define a resonant frequency equal to an AC line frequency.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a variable capacity drive circuit of a compressor, the variable capacity drive circuit having at least, a first four-quadrant switch, a second four-quadrant switch, and a motor, the method comprising:
   operating the first and second four-quadrant switches in a first state in which the first four-quadrant switch is closed and the second four-quadrant switch is open, wherein, in the first state, a voltage seen by the motor is equal to an alternating current (AC) line voltage;
   operating the first and second four-quadrant switches in a second state in which the first four-quadrant switch is open and the second four-quadrant switch is closed, wherein, in the second state, the voltage seen by the motor is to zero;

providing a positive firing angle and a negative firing angle, the positive and negative firing angles defining when the first and second four-quadrant switches are operated in each of the first and second states; and transitioning between the first state and the second state using the positive and negative firing angles at a switching frequency determined by the AC line voltage so as to control a percentage of voltage being applied to the compressor for a positive half-cycle and a negative half-cycle.

2. The method of claim 1, wherein determining the switching frequency by the AC line voltage frequency comprises synchronizing the switching frequency to the AC line voltage such that the four-quadrant switches transition, at most, twice per half-cycle.

3. The method of claim 2, wherein the switching frequency is equal to 60 Hertz (Hz) or 120 Hz.

4. The method of claim 1, wherein transitioning between the first state and the second state using the positive and negative firing angles further comprises using the positive and negative firing angles to modulate the voltage applied to the motor, the voltage comprising an AC component and a direct current (DC) component.

5. The method of claim 4, wherein the positive and negative firing angles comprise different modulation levels for each of the positive and negative half-cycles, respectively, in order to induce the AC component and the DC component of the voltage in the motor.

6. The method of claim 4, further comprising applying the positive firing angle and the negative firing angle at a beginning of a half cycle or end of a half-cycle to minimize an effect on a total harmonic distortion of at least one of the AC component or the DC component of the voltage applied to the motor.

7. The method of claim 6, further comprising applying the positive firing angle at an end of the positive half-cycle and a negative firing angle at a beginning of the negative half-cycle or the positive firing angle at the beginning of the positive half-cycle and the negative firing angle at the end of the negative half-cycle such that two second states are consecutive, thereby reducing the switching frequency.

8. The method of claim 4, further comprising increasing the positive and negative firing angles equally to reduce the AC component of the voltage in the motor.

9. The method of claim 4, further comprising injecting a difference in the positive and negative firing angles to control the DC component of the voltage applied to the motor.

10. The method of claim 4, wherein a standard operating mode of the compressor defines a resonant frequency equal to an AC line frequency.

11. The method of claim 10, wherein using the timing between switching between the first and second states to modulate the voltage applied to the motor further comprises:

using the DC component of the voltage to bias a center point of oscillation of a piston of the compressor to minimize a top dead center volume of the piston; and using the AC component of the voltage to modulate a capacity of the compressor via a stroke length of the piston.

12. The method of claim 1, further comprising determining the first and second firing angles utilizing at least one look-up table.

* * * * *